July 24, 1956 W. W. MAYS 2,755,499
ELECTRICALLY HEATED WINDSHIELD WIPER
Filed March 22, 1954 2 Sheets-Sheet 1
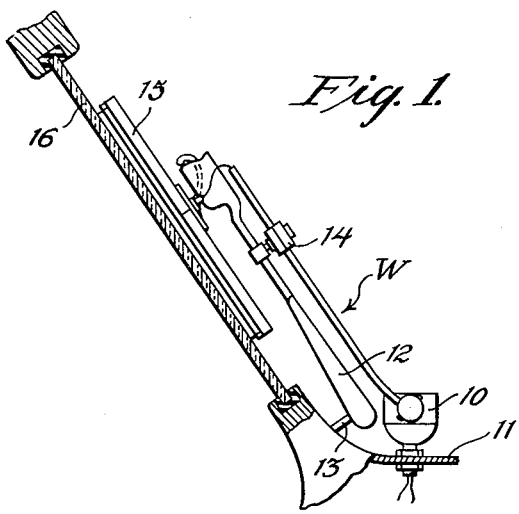
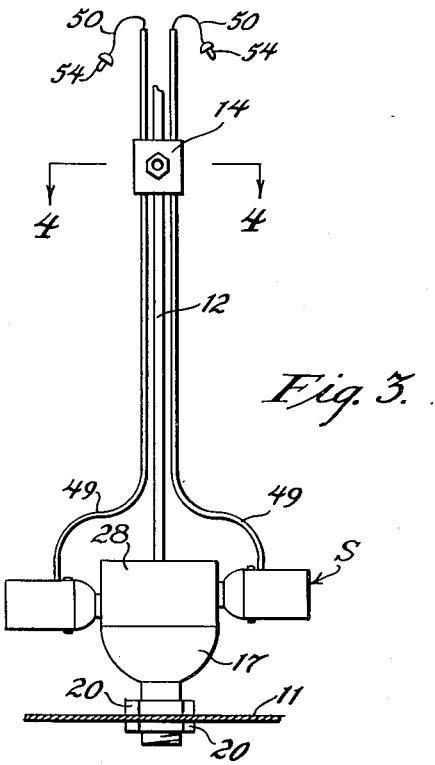
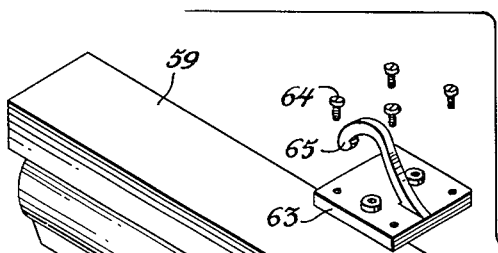
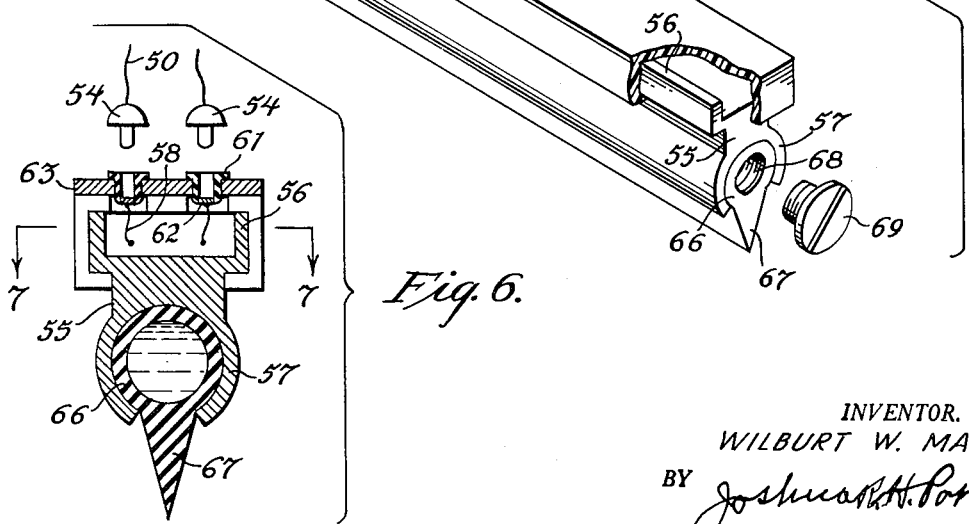
INVENTOR.
WILBURT W. MAYS
BY Joshua R. H. Potts
HIS ATTORNEY.

July 24, 1956 W. W. MAYS 2,755,499
ELECTRICALLY HEATED WINDSHIELD WIPER
Filed March 22, 1954 2 Sheets-Sheet 2

INVENTOR.
WILBURT W. MAYS
BY Joshua R H Potts
HIS ATTORNEY

United States Patent Office 2,755,499
Patented July 24, 1956

2,755,499

ELECTRICALLY HEATED WINDSHIELD WIPER

Wilburt W. Mays, Philadelphia, Pa.

Application March 22, 1954, Serial No. 417,691

5 Claims. (Cl. 15—250.5)

This invention relates to a windshield wiper, and particularly to a windshield wiper which is electrically heated so as to prevent the accumulation of ice on the windshield which it contacts.

It is common knowledge that, in areas subject to low temperature conditions, snow, rain and sleet present a definite hazard of the formation of ice upon automotive windshields, reducing materially the field of vision of the driver. A similar problem also exists in aircraft, locomotives, and the like. Under such low temperature conditions a moving windshield wiper in surface contact with the windshield further aggravates the reduction in the field of vision.

With these conditions in mind, it is an object of this invention to provide an improved windshield wiper.

It is a further object of this invention to provide an electrically heated windshield wiper blade.

Another object of this invention is to provide an electrically heated windshield wiper blade which is susceptible of use with the conventional windshield wiper arm on existing automobiles.

Still a further object of this invention is to provide an electrically heated windshield wiper which is capable of deriving its source of power from the automobile storage battery.

These objects and other objectives and advantages to be derived from the present invention will become more apparent by reference to the following disclosure and accompanying drawings wherein similar numerals refer to similar parts throughout the several views.

Figure 1 is a diagrammatic side elevational view of the windshield wiper of the present invention shown in association with an automobile windshield.

Figure 3 is a plan view of the windshield wiper turning mechanism showing the said mechanism attached to the automobile hood and to the conventional windshield wiper arm.

Figure 5 is a perspective view of the windshield wiper blade of the present invention, partly broken away, showing the parts thereof in exploded relationship.

Figure 6 is a cross-sectional view of the windshield wiper blade illustrating how the blade point is heated.

Figure 4:
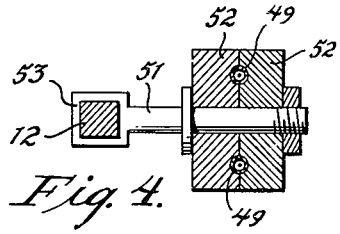
Figure 4 is a cross-sectional view of the connecting link for joining the turning mechanism to the windshield wiper arm, taken along the line 4—4 of Fig. 3.

Referring to the drawings, and particularly Fig. 1 thereof, there is shown therein the complete windshield wiper assembly of the present invention, referred to in its entirety by the letter W. This assembly consists of a turning mechanism 10 fixedly secured to a hood 11 of an automobile, a conventional windshield wiper arm 12 pivotally attached to the automible body as at 13 and connected to said turning mechanism by means of a movable connecting link 14, and a windshield wiper blade 15 carried by said arm and making a surface contact with a windshield 16.

Figure 2:
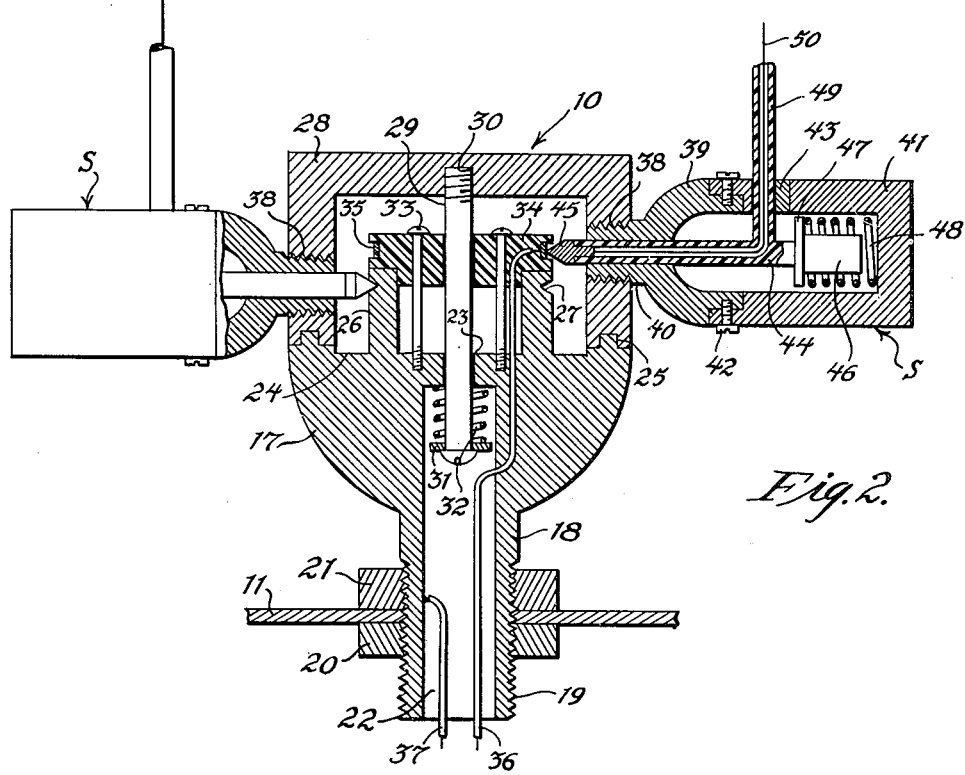
Figure 2 is a cross-sectional view of the turning mechanism of the present windshield wiper assembly with parts broken away.

Referring now to Fig. 2 of the drawing, the turning mechanism 10 is shown as consisting of a circular base member 17 having a neck portion 18 extending downwardly therefrom and threaded for a portion of its length as indicated at 19. The said threaded portion, in cooperation with the lock nuts 20 and 21, fixedly secures the said circular base member 17 to the automobile hood 11. The said circular base member 17 is provided with a bore 22 extending part way therethrough from the end of the neck portion 18 and continuing through the remainder of said circular base member at a smaller diameter as shown at 23. The said circular base member 17 is provided with a flat surface 24 from which extends a circumferential ridge 25 near the periphery thereof. A second ridge 26, lying concentric with the said ridge 25, extends from said surface 24 and is provided with a V-shaped notch 27 in the external surface thereof near its free end.

Cooperating with the circular base member 17 in slidable engagement therewith is a cylindrical rotating member 28 whose free edge is formed with a groove corresponding in size and shape to the circumferential ridge 25 for engagement therewith. The said rotating member is maintained in rotatable contact with the circular base member 17 by means of a spring-biased bolt 29 which is threadably secured to the said rotatable member as at 30, and which resides in the bore 22 and the smaller diameter bore 23. Adjacent to the head of the bolt 29 is a washer 31 which forms a seat for a coil spring 32 surrounding said bolt and holding the rotatable member 28 in yieldable contact with the circular base member 17. Residing on the ridge 26 and fixedly secured thereto by means of bolts 33 is an insulated disk 34 made from a suitable plastic or the like, having a conductor strip 35 made from copper or similar material secured to the circumference thereof and preferably seated in a ridge as shown. A wire 36 is connected to the said conductor 35, which wire is connected to the electrical source of the automobile, such as the storage battery thereof, for a purpose to be described below. The ground wire 37 is connected to the circular base member 17 at a point within the bore 22, as shown in Fig. 2.

The cylindrical rotatable member 28 is provided with a pair of diametrically opposed tapped holes 38 which accommodate a pair of swivel members referred to in their entirety by the letter S. Since these swivel members are identical in structure, it is considered that the description of one in detail will suffice for the purposes of the present disclosure. It will be noted that the two members are displaced vertically from one another for a reason to be discussed below. As shown in Fig. 2, the swivel member S consists of a fixed portion 39 having a threaded neck 40 threadably engaging said tapped hole 38. Cooperating with said fixed member 39 in slidable engagement therewith is a movable member 41 which slides over the free end of said fixed member 39 and is held in position thereon by means of screws 42, whose ends reside in a circumferential groove in the external surface of said free end. Thus, once the said movable member 41 is slipped over the free end of said fixed member 39 and the screws 42 are inserted into the above-mentioned grooves, the said movable member is precluded from being disengaged therefrom but is still permitted to slidably revolve about said fixed member. The said fixed member 41 is provided with an elongated slot 43. Residing within the space formed by the joinder of the slidable member 41 and the fixed member 39 is a spring loaded electrical contact member 44 made from an insulating material such as plastic or the like, and having a bore therein to accommodate a conducting wire. One end of the electrical contact member 44 extends through the threaded neck 40 and carries in its free end extending therefrom a pointed metallic contact member 45 which member contacts the conductor strip 35 on the disk 34.

The end of said electrical contact member 44, remote from said pointed contact member 45, and lying within the slidable member 41, is provided with an enlarged cylindrical member 46 having an extended flange 47 at one end thereof. Surrounding said enlarged cylindrical member 46 and lying in abutting relationship to said flange 47 and the slidable member 41 is a coil spring 48 whose function it is to maintain the pointed contact 45 in engagement with the conductor strip 35. Extending upwardly from the electrical contact member 44 and passing through the elongated slot 43 is a conduit member 49 which accommodates a conducting wire 50 connected to the pointed contact 45. It will be noted that while one contact point 45 engages the conductor strip 35, the other contact point resides in the V-shaped notch 27 of the ridge 26.

Referring to Fig. 3, it will be seen that the conduit members 49, extending outwardly from the swivel members S, extend upwardly in a substantially parallel relationship and are maintained in said parallel relationship and slidably connected to the arm 12 by means of connecting link 14 shown in detail in Fig. 4. The conduit members 49 are fixedly secured to the connecting link 14 by means of a screw member 51 passing through a pair of clamping blocks 52 between which the conduit members 49 are maintained in clamped engagement. The screw member 51 is provided with an eye 53 on one end thereof, through which the wiper arm 12 passes in slidable engagement. Thus, as the wiper arm 12 moves back and forth in an oscillating manner, the connecting link 14 is permitted to move freely along said arm. Extending outwardly from the extreme ends of said conduit members 49 are the conducting wires 50, each of which is provided with a plug 54 for a purpose to be described below.

Figure 7:
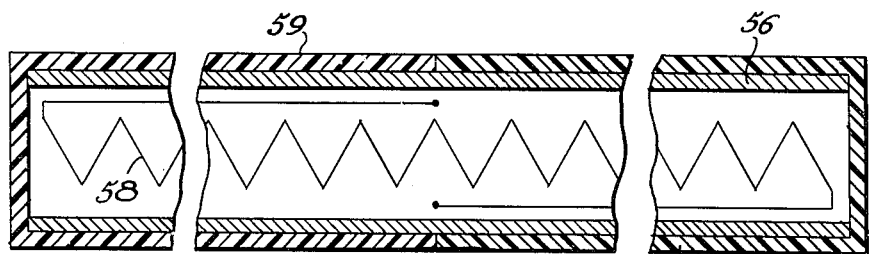
Figure 7 is a sectional view of the windshield wiper blade taken along the line 7—7 of Fig. 6.

The windshield wiper blade which is removably connected to the wiper arm 12 and shown in detail in Figs. 5, 6 and 7, consists of a metallic frame member 55 comprising a top U-shaped channel 56 and a bottom channel 57 of substantially circular configuration. Lying within the U-shaped channel 56 is a resistance coil 58, as shown in Fig. 7, and surrounding the said U-shaped channel so as to close the said channel and resistance coil off from exposure to the atmosphere, is a plastic cover member 59. It will be noted that the said cover member is made in two parts, and slidably engages the said U-shaped channel 56 from the extreme ends thereof, so that upon meeting each other at the centermost point of said U-shaped member, the said parts form two apertures 60 which accommodate the sockets 61 shown in Fig. 6. The said sockets 61 are made from a suitable plastic and have a metallic bottom 62 to which is connected the free ends of the resistance coil 58. The said sockets 61 are adapted for receiving the plugs 54 connected to the wires 50. The two sections of the plastic cover member 59 are held together in abutting relationship by means of a plate 63, secured thereto by means of screws 64, and having a hook 65 extending outwardly therefrom for connecting the said windshield wiper blade to the wiper arm 12.

The open ends of the sockets 61 extend outwardly from the said plate 63. Residing in the circular channel section 57 of the metallic frame 55 is a hollow windshield contacting element 66 of substantially circular cross-section, having a pointed portion 67 outstanding therefrom. The said hollow member is made from rubber or the like, and is threaded at both ends, as shown at 68, to accommodate a plug 69.

Operation

In using the windshield wiper of this invention, the turning mechanism 10 is attached to the hood 11 of the automobile, as shown in Fig. 3, and the conduit members 49 are slidably connected to the wiper arm 12 by means of the connecting link 14, as described above. Then, the conventional wiper blade is removed from the wiper arm, and the wiper blade of the present invention is substituted therefore, whereupon the plugs 54 are inserted into the sockets 61. Prior to the attachment of the present wiper blade to the wiper arm 12, the hollow windshield contacting element 66 is filled with a heat conducting medium which is not susceptible to freezing at ordinary freezing temperatures. The present invention contemplates the use of Prestone or the like for this purpose. The wire 36 which transmits current to the conductor strip 35 is connected to the automobile battery through a suitable switch which may be located on the dashboard of the automobile, and the wire 37 is suitably grounded as shown in schematic in the circuit diagram of Fig. 8.

Figure 8:
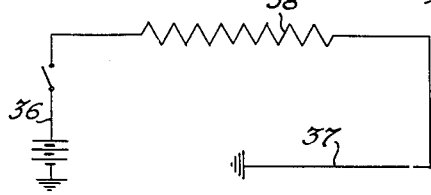
Figure 8 is a schematic diagram of the electric circuit of the present invention.

Thus assembled, when the driver encounters freezing of his windshield during cold weather driving, he need merely throw the switch on the dashboard, completing the electrical circuit of Fig. 8, whereupon current will be transmitted from the automobile battery through the wire 36, the conductor strip 35, to the pointed contact 45, through the wire 50 and to the resistance coil 58, whereupon the said coil will generate heat. The heat from said coil is transmitted through the metallic frame 55 to the heat conducting medium within the windshield contacting element 66, and from the said medium to the point of the pointed portion 67, it being understood that heat travels to a point. The point of said pointed portion being in contact with the ice-covered windshield, it is readily understandable that the heat therefrom will melt said ice, presenting a clear windshield.

It is therefore seen, from the above description, that a novel windshield wiper is presented which overcomes the hazards of cold weather driving, and particularly the hazard of the windshield of an automobile becoming coated with ice. And this it accomplishes by means of a mechanism which can be installed on the present day automobile and used together with the conventional wiper arm existing thereon.

Although the present discussion of this invention has been limited to the above-described preferred embodiment, variations thereof are possible without departing from the spirit of the invention. It is to be understood, therefore, that the invention is not to be limited to the above-described embodiment, but merely to the inventive concept as defined by the appended claims.

What is claimed is:

1. An electrically heated windshield wiper comprising a conventional automotive wiper arm, a rotatable support member; a pair of swivel arms carried by said support member; means associated with said supprt member and swivel arms for conducting a current of electricity; and a liquid-filled wiper blade adapted for being heated by said current of electricity, the said wiper blade comprising a metallic frame having an upper U-shaped channel portion and a lower semi-circular channel portion, a heat-conducting wiping element positioned in said lower channel portion, a heat-conducting liquid medium contained within said wiping element, and an electrical resistance coil residing in said upper U-shaped channel portion and adapted for being heated by said current of electricity so as to heat said liquid medium and wiping element by conduction; the said blade being detachably attached to said wiper arm and electrically connected to said support member and swivel arms.

2. An electrically heated windshield wiper comprising a conventional automotive wiper arm, a rotatable support member; a pair of swivel arms carried by said support member; means associated with said support member and swivel arms for conducting a current of electricity; and a wiper blade adapted for being heated by said current of electricity, the said wiper blade comprising a metallic frame having an upper U-shaped channel portion and a lower semi-circular channel portion, a cylindrical rubber wiping element slidably positioned in said lower channel portion, a wedge-shaped projection on said wiping element and integral therewith, a heat-conducting liquid medium within said cylindrical wiping element, and an electrical resistance coil residing in said upper U-shaped channel portion and adapted for being heated by said current of electricity so as to heat said liquid medium by conduction; the said blade being detachably attached to said wiper arm and electrically connected to said support member and swivel arms.

3. An electrically heated windshield wiper comprising a conventional automotive wiper arm, a rotatable support member; a pair of swivel arms carried by said support member; means associated with said support member and swivel arms for conducting a current of electricity; and a wiper blade adapted for being heated by said current of electricity, the said wiper blade comprising a metallic frame having an upper U-shaped channel portion and a lower semi-circular channel portion, a cylindrical rubber wiping element slidably positioned in said lower channel portion, an integral wedge-shaped projection on said wiping element, a low freezing/high boiling heat-conducting liquid within said cylindrical wiping element, an electrical resistance coil residing in said upper U-shaped channel portion and adapted for being heated by said current of electricity so as to heat said liquid by conduction, a cover for said U-shaped channel portion, a hook on said cover for detachably attaching the said blade to said wiper arm, and means for electrically connecting said wiper blade to said support member and swivel arms.

4. An electrically heated windshield wiper blade comprising, a metallic frame having an upper U-shaped channel portion and a lower semi-circular channel portion, a cylindrical rubber wiping element slidably positioned in said lower channel portion, a wedge-shaped projection on said wiping element, a heat-conducting liquid medium within said cylindrical wiping element, and an electrical resistance coil residing in said upper U-shaped channel portion and adapted for being heated by a current of electricity so as to heat said liquid medium and wiping element by conduction, and means for detachably attaching the wiper blade to a wiper arm.

5. An electrically heated windshield wiper blade comprising, a metallic frame having an upper U-shaped channel portion and a lower semi-circular channel portion, a cylindrical rubber wiping element slidably positioned in said lower channel portion, an integral wedge-shaped projection on said wiping element, a low freezing/high boiling heat conducting liquid within said cylindrical wiping element, an electrical resistance coil residing in said upper U-shaped channel portion and adapted for being heated by a current of electricity so as to heat said liquid by conduction, a cover for said U-shaped channel portion, and a hook on said cover for detachably attaching the wiper blade to a wiper arm.

References Cited in the file of this patent

UNITED STATES PATENTS

| | | |
|---|---|---|
| 1,699,634 | Smulski | Jan. 22, 1929 |
| 1,868,783 | Williams | July 26, 1932 |
| 2,234,161 | Anderson et al. | Mar. 4, 1941 |
| 2,354,440 | Brown | July 25, 1944 |
| 2,550,504 | Vidrick et al. | Apr. 24, 1951 |
| 2,677,143 | Blaney | May 4, 1954 |